United States Patent [19]

Watanabe

[11] Patent Number: 4,645,333
[45] Date of Patent: Feb. 24, 1987

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 738,251

[22] Filed: May 28, 1985

[30] Foreign Application Priority Data

Jun. 1, 1984 [JP] Japan .................................. 59-112503

[51] Int. Cl.⁴ ............................................ G03B 27/52
[52] U.S. Cl. ...................................... 355/30; 361/383;
361/384; 165/80.2; 165/80.3; 346/76 R
[58] Field of Search ...................... 355/3 D; 174/15 R;
361/383, 384; 165/80 A; 353/57, 58, 60; 346/76 R

[56] References Cited

U.S. PATENT DOCUMENTS

| | | | |
|---|---|---|---|
| 3,790,859 | 2/1974 | Schraeder et al. | 361/384 |
| 4,089,040 | 5/1978 | Paulsen | 361/384 X |
| 4,217,952 | 9/1980 | Kelly | 361/384 X |

OTHER PUBLICATIONS

Toshiba BD-7812 Service Manual.

Primary Examiner—L. T. Hix
Assistant Examiner—D. Rutledge
Attorney, Agent, or Firm—Oblon, Fisher, Spivak, McClelland & Maier

[57] ABSTRACT

An image forming apparatus comprises an image formation unit and a rack unit accommodating printed circuit boards. A fan unit for cooling the printed circuit boards is provided along one side of the bottom of the housing of the apparatus. A cross-flow fan is used for the fan unit.

9 Claims, 10 Drawing Figures

IMAGE FORMING APPARATUS

BACKGROUND OF THE INVENTION

This invention relates to an image forming apparatus and, more particularly, to an image forming apparatus, which includes a unit for cooling the printed circuit boards used in the apparatus.

One of the known image forming apparatus of this type is a thermal transfer printer. The printer usually has a large circuit for processing digital signals. The larger the circuit, the more printed circuit (PC) boards are used. The more PC boards, the more heat is generated. Hence, the printer is provided with a fan for cooling PC boards. The fan is provided in the printer housing and adjacent to a ventilating hole cut in the back of the housing. Therefore, the prior art printer requires a space for accommodating the fan, and its size increases. In addition, since the fan is provided near the ventilating hole, the noise produced directly comes out through the hole.

SUMMARY OF THE INVENTION

An object of the invention is to provide an image forming apparatus, which is small and produces less noise.

According to an aspect of the present invention, there is provided an image forming apparatus which comprises an image forming unit, a rack unit accommodating printed circuit boards and a fan unit provided on one side of the bottom of the apparatus housing to cool the printed circuit boards. The fan unit includes a cross-flow fan.

BRIEF DESCRIPTION OF THE INVENTION

DETAILED DESCRIPTION OF THE PREFERRED EMBODIMENT

Figure 1:
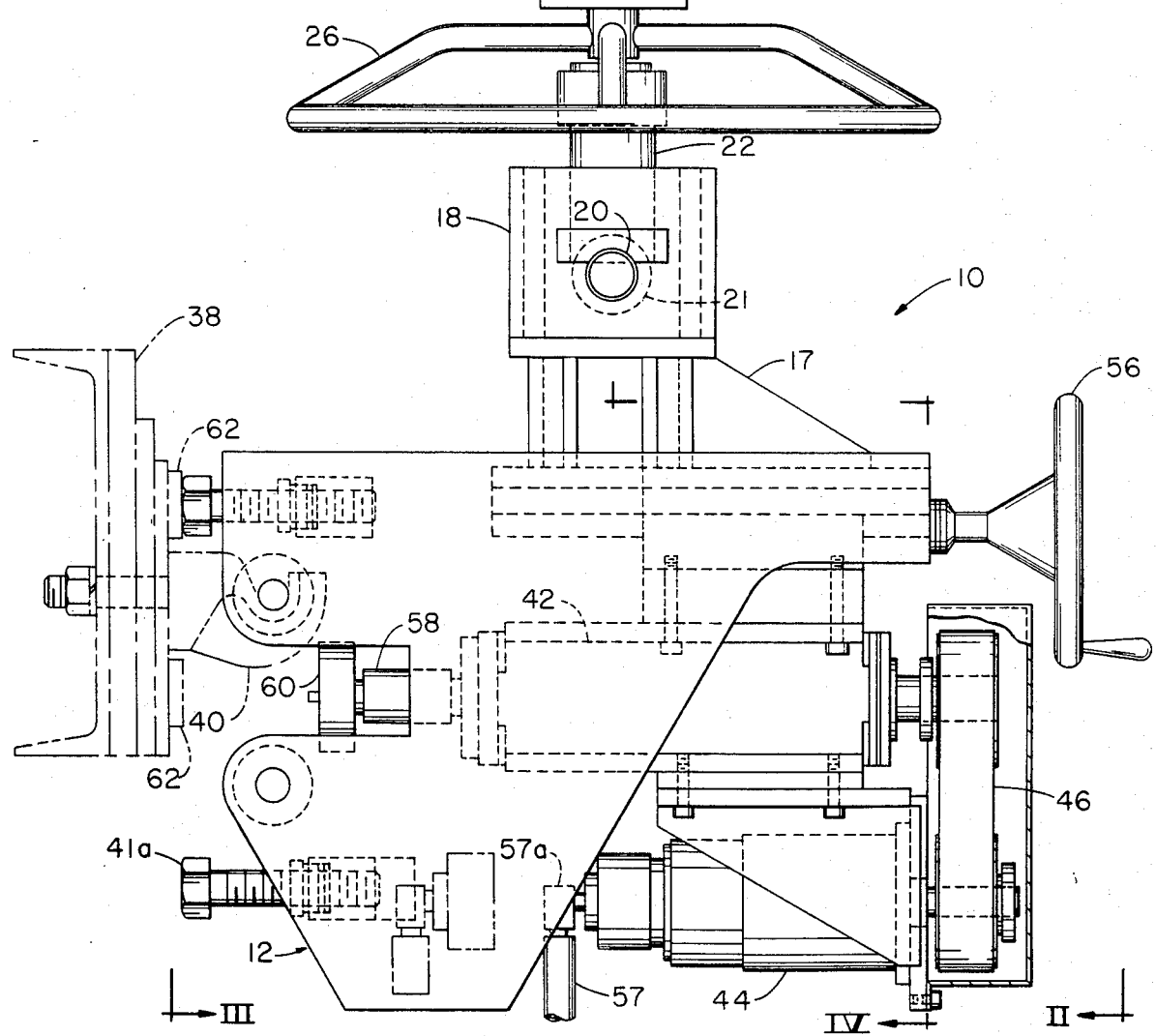
FIG. 1 is a perspective view of a thermal transfer printer according to the invention.
Figure 3:
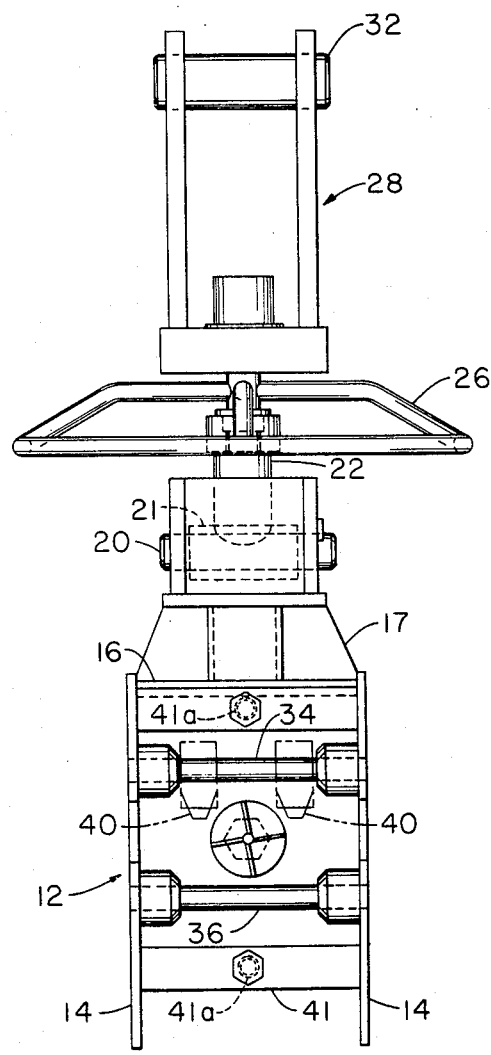
FIG. 3 is a schematic perspective view of the internal construction of the printer shown in FIG. 1.

Now, an embodiment of the invention will be described in detail with reference to the accompanying drawings. FIG. 1 shows a thermal transfer printer 10, an image forming apparatus according to the invention. The housing 12 of the printer 10 has a control panel 14 provided on a right front portion of the top. The panel 14 has a display section 16 for displaying an image formation operation, numeral keys 18 and a start key 20. A sheet tray 22 for receiving printed sheets is provided on top of the housing 12. As shown in FIG. 3, the housing 12 contains an image formation unit 24 and a rack unit 26 accommodating printed circuit boards. The unit 24 is provided on one side of the control panel 14, and beside the rack unit 26. The units 24 and 26 will be described later in detail.

Figure 2:
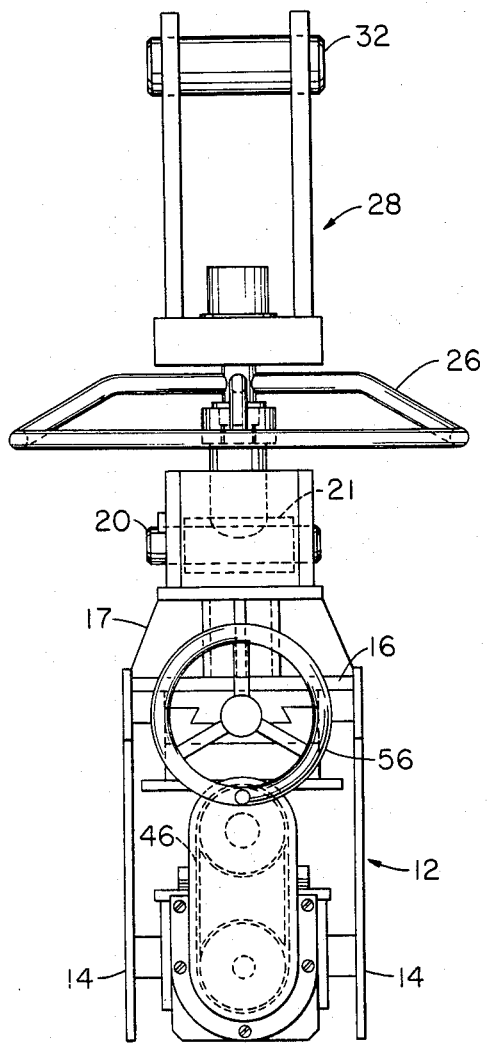
FIG. 2 is a perspective view of the printer shown in FIG. 1 with an image information reading unit.

As shown in FIG. 2, an original image information reading unit 28 is provided on top of the housing 12. The unit 28 optically scans an original and photoelectrically converts optical information into digital signals which are supplied to the housing 12. According these signals, the image formation unit 24 forms an image on a paper sheet P.

As shown in FIG. 3, the image formation unit 24 has a cassette holder 32, in which a ribbon cassette 30 is loaded. It also has a thermal head 34 for heating that portion of a ribbon 36 which is exposed from the ribbon cassette 30 to transfer color agent or ink to the sheet P. The heating elements of head 34 are heated in accordance with the pattern signal from the original image information reading unit 28 and melts a color agent applied to the ribbon 36 and transfers it to the sheet P. A platen 38 for pressing the ribbon 36 and the sheet P against the thermal head 34 faces the thermal head 34 with the ribbon 36 between them. A cassette 40 accommodating sheets is disposed beneath the cassette holder 32. A guide plate 42 is provided to guide sheets from the cassette 40 to the thermal head 34.

Figure 4:
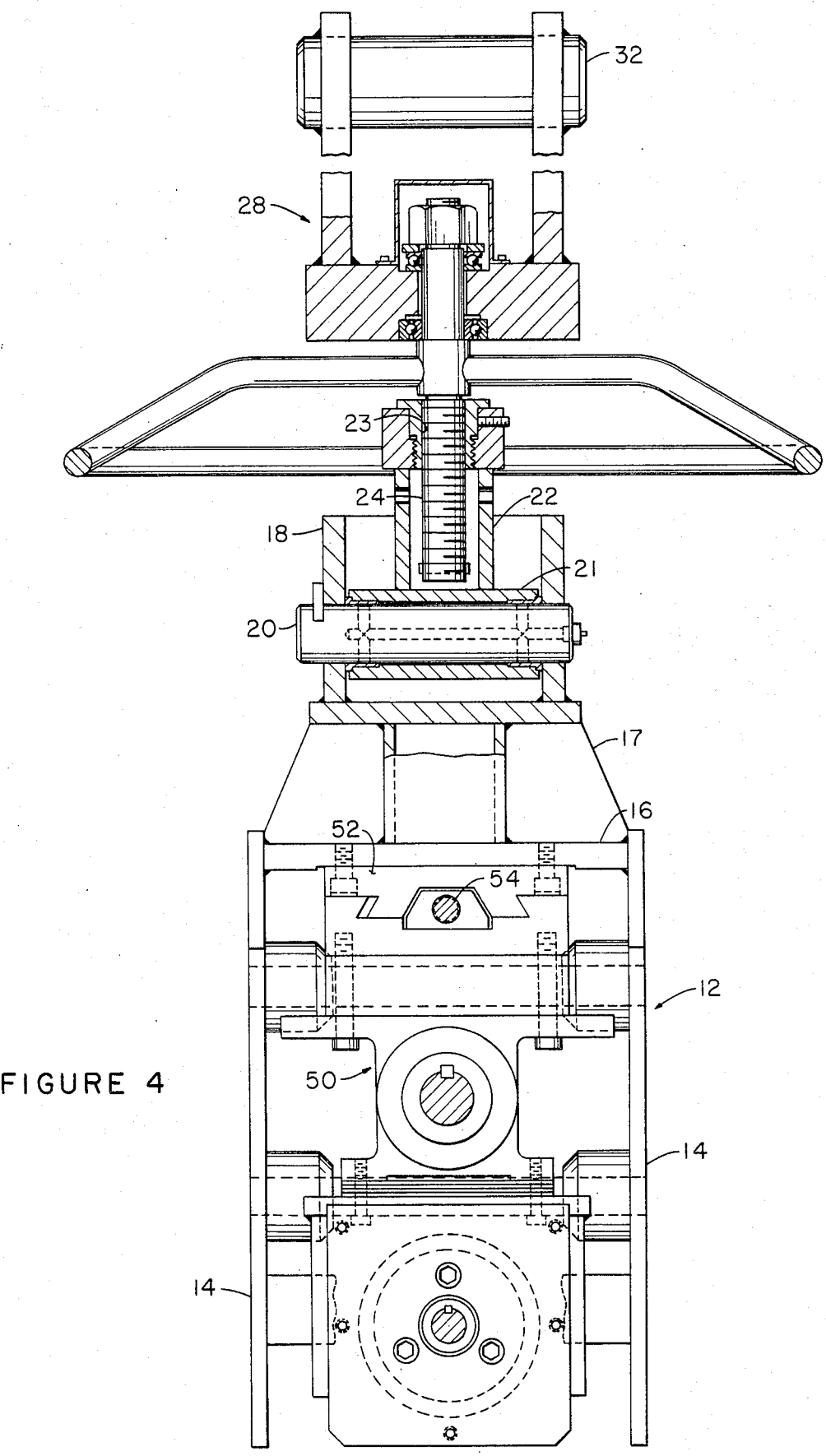
FIG. 4 is a schematic perspective view of a rack unit.
Figure 1:
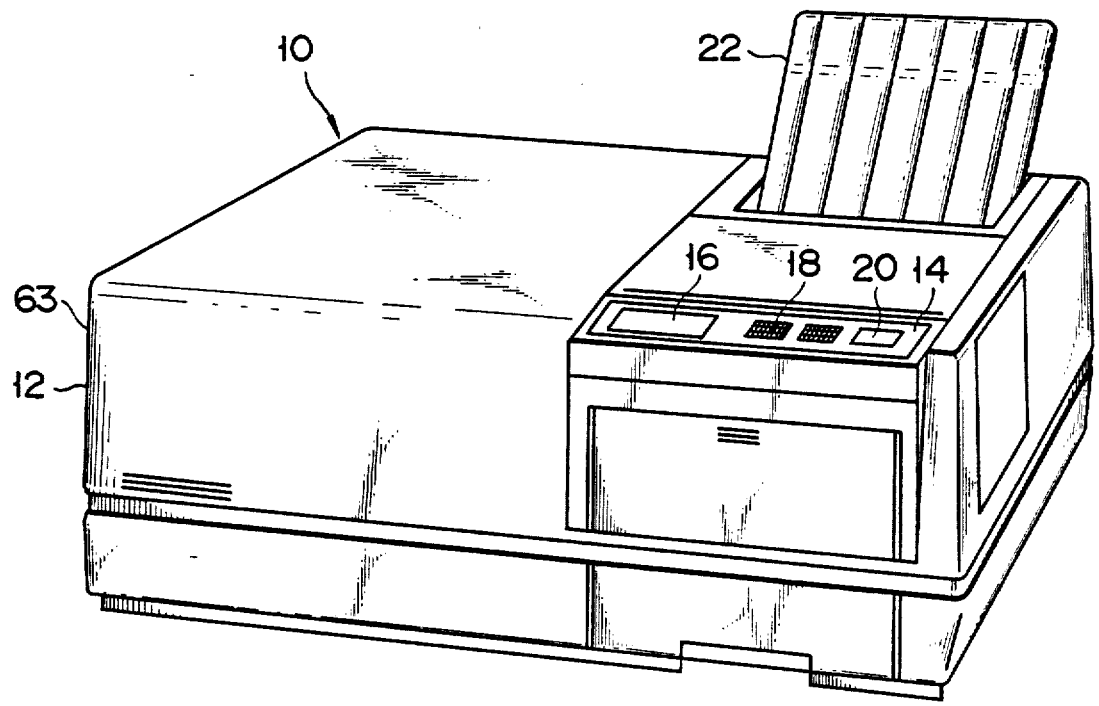
Figure 2:
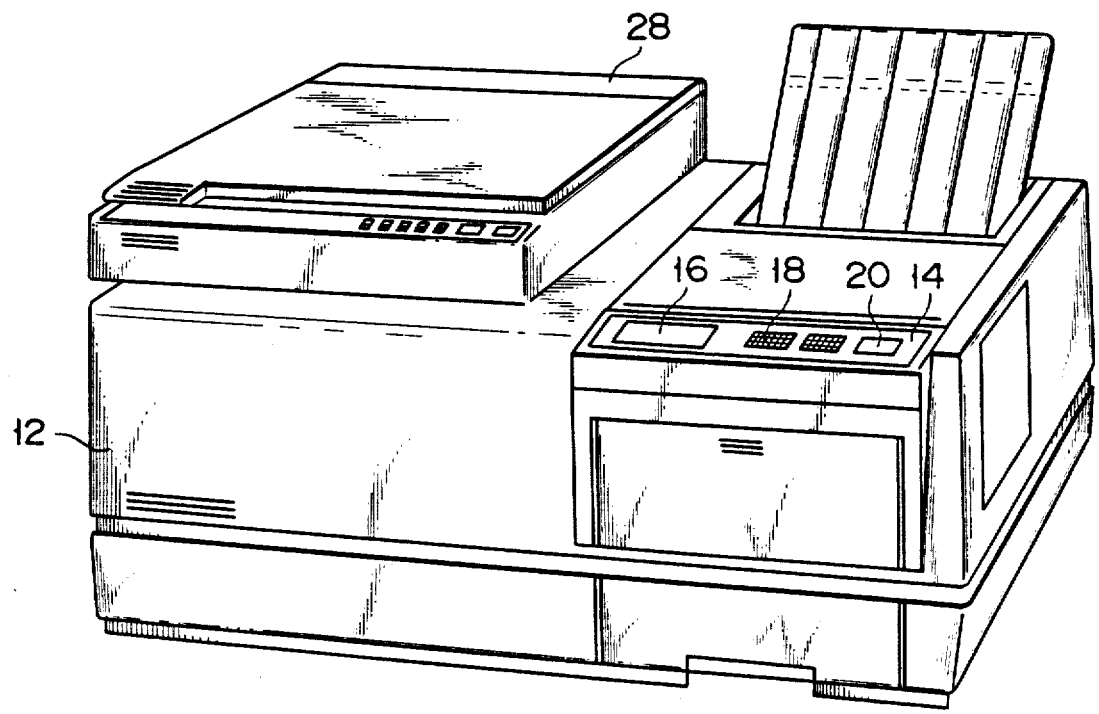
Figure 3:
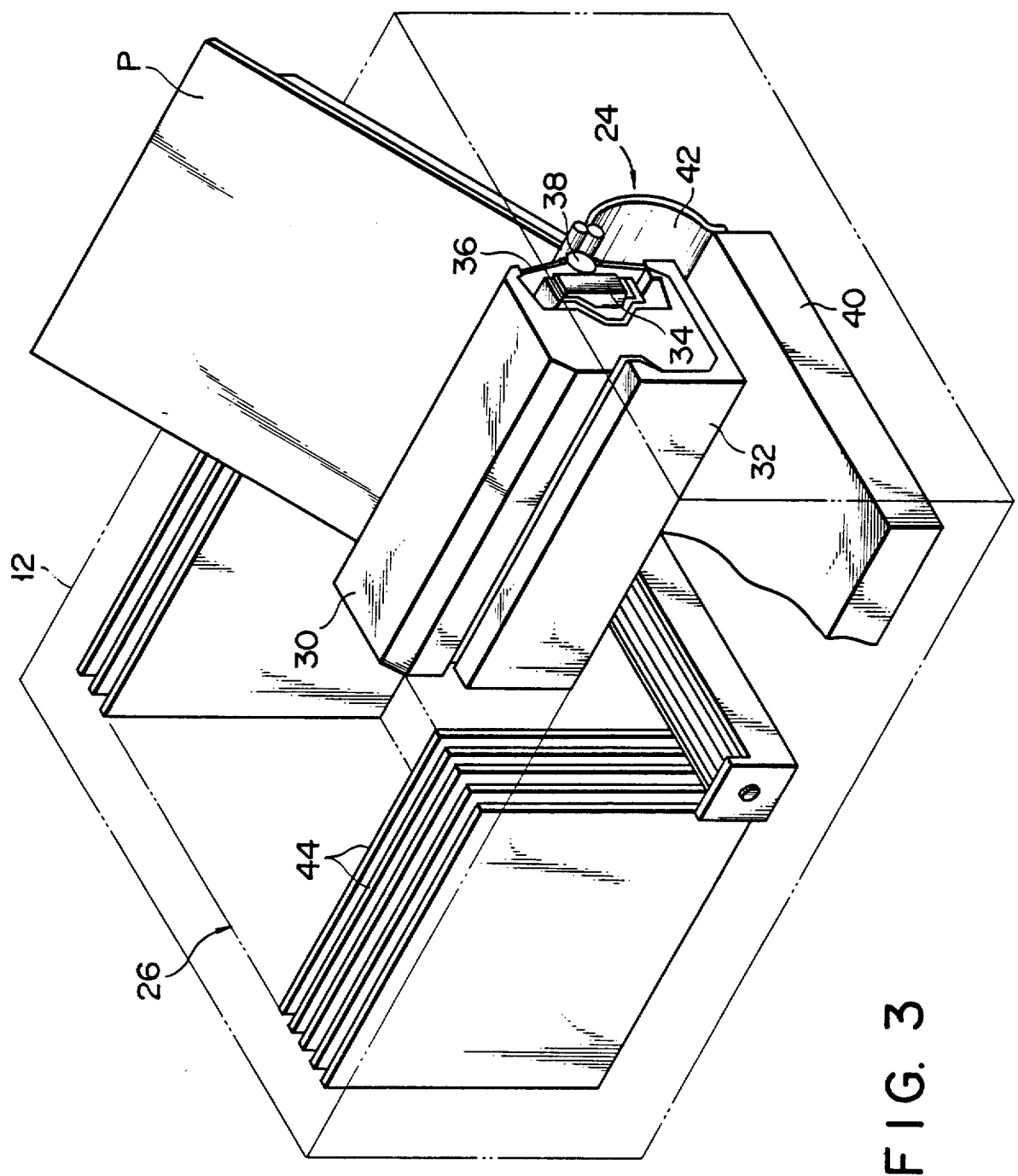
Figure 4:
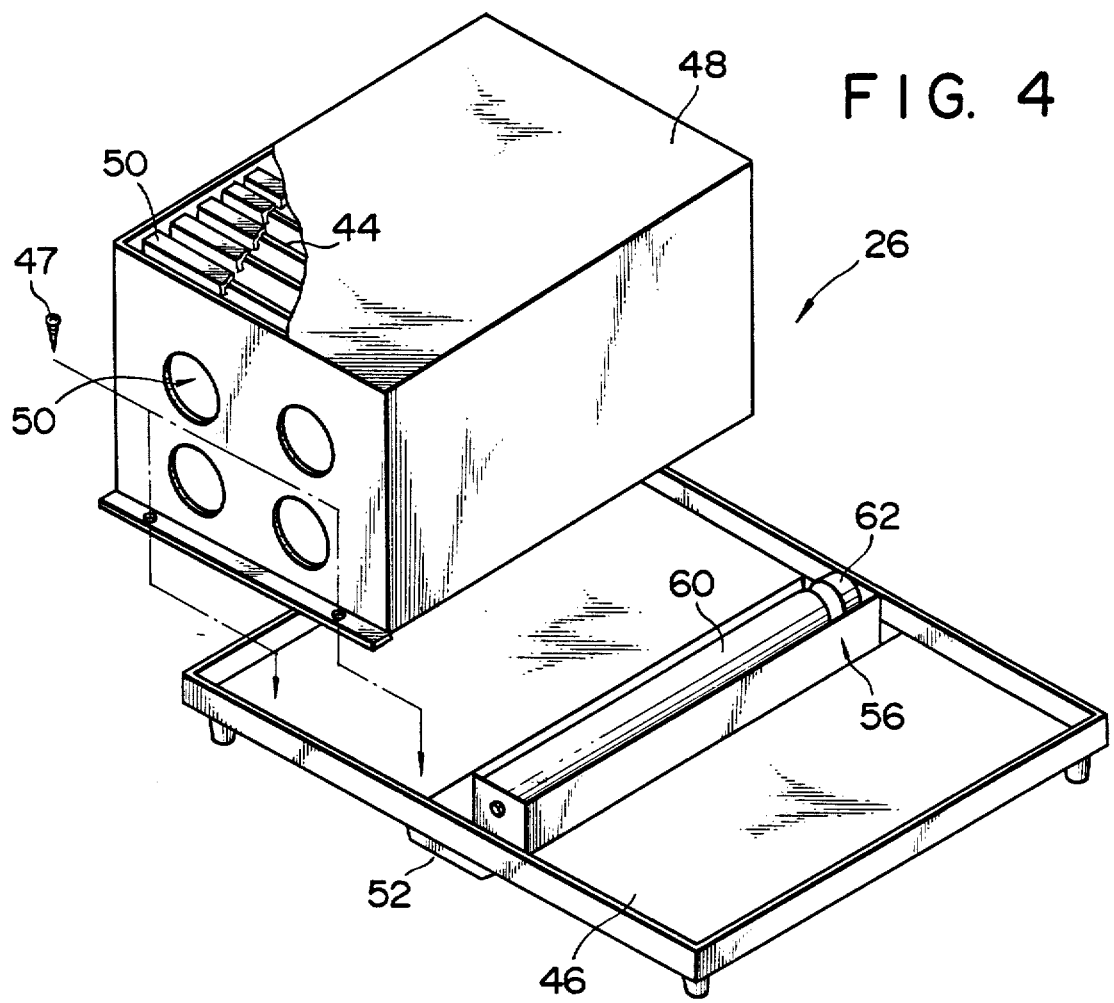
Figure 5:
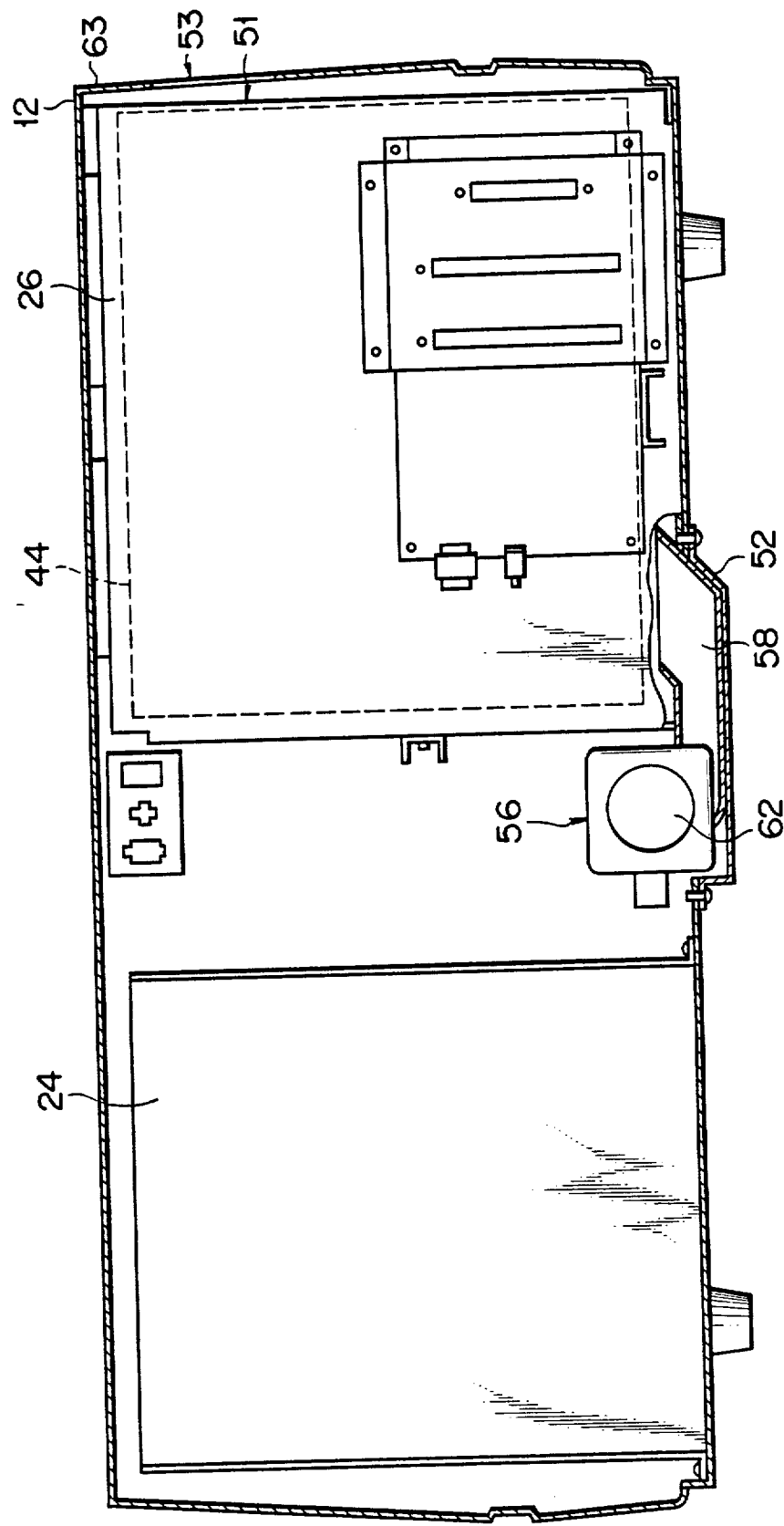
FIG. 5 is a schematic sectional view of the printer shown in FIG. 1.
Figure 6:
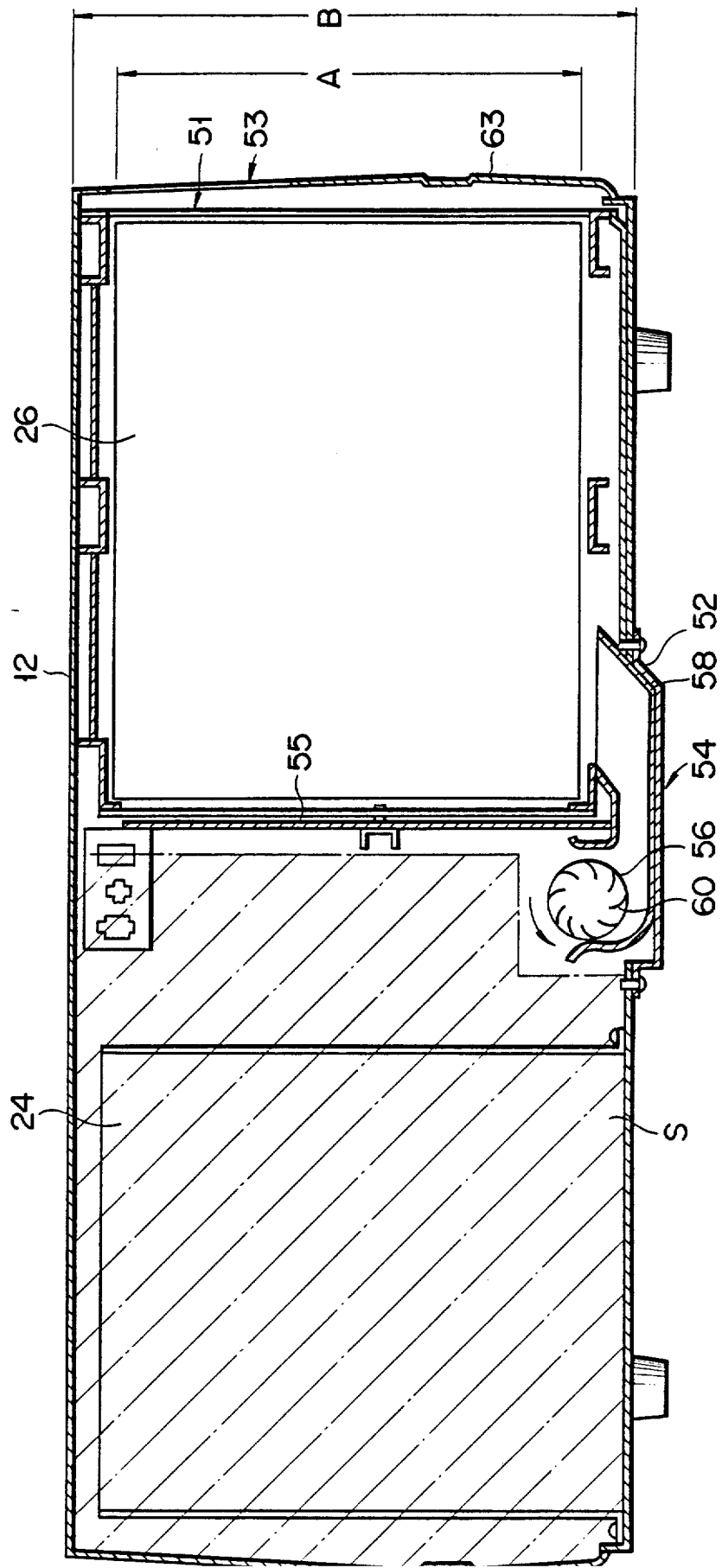
FIG. 6 is another sectional view of the printer shown in FIG. 1.

In the rack unit 26, a plurality of printed circuit boards (hereinafter referred to as PC boards) 44 are arranged in a row at regular intervals. As shown in FIG. 4, the unit 26 consists of a portion of a base 46 constituting the bottom of the housing 12 and a box 48 secured by screws 47 to the base 46. The opposite side walls of the box 48 (only one shown) each have four ventilating holes 49. Disposed in upper and lower portions of the interior of the box 48 are guide rails 50 for supporting and guiding the PC plates 44 (only upper rails shown in FIG. 4). These guide rails 50 are arranged at regular intervals. The box 48 is open at the bottom and one side 51 in the direction of the guide rails 50. The open side 51 faces a ventilating hole 53 (described later) as shown in FIGS. 5 and 6. The guide rails 50 extend across the box 48. The base 46 has a groove 52 formed substantially in a center portion. The groove 52 extends in a direction perpendicular to the direction of the PC plates. It constitutes part of the bottom of the rack unit 26. A mother board 55 for connecting the circuit of the PC boards (see FIG. 8) is provided in the box 48 and extends across the PC boards 44.

As shown in FIGS. 5 and 6, a fan unit 54 is provided in the groove 52 to cool the PC boards. The unit 54 consists of a cross-flow fan 56 extending across the housing 12 for supplying air and a duct 58 for guiding air from the cross-flow fan 56. The duct 58 extends along the groove 52 from the base 46 on the side of the image formation unit 24 through the side wall of the box 48 into the bottom of the rack unit 26. The fan 56 is provided in the duct 58 below the image formation unit 24. As shown in FIG. 4, the fan 56 is substantially cylindrical and has a plurality of longitudinally extending blades 60. As shown in FIG. 6, the blades 60 have an arcuate section. One end of the cross-flow fan 56 is coupled to a motor 62 and driven. The fan 56 is hollow. It can provide a greater quantity of air and produces less noise compared to a propeller fan. In addition, since it has a cylindrical elongate shape, it requires less space. Further, the fan unit 54 is provided in the groove 52 cut in the base 46 and substantially below the borderline zone between the image formation unit 54 and rack unit 26. Thus, the noise of the fan unit does not go out of the housing through the ventilating hole.

More specifically, the shaded area S shown in FIG. 6, in which the image formation unit 24 and other components are arranged, can be increased in size, while reducing the difference between the height size A of the CP boards 44 and height size B of the housing 12. Further, the fan unit 54 is not obstructive to the image formation unit 24, rack unit 26 and other components, and its space thus can be minimized.

Figure 7:
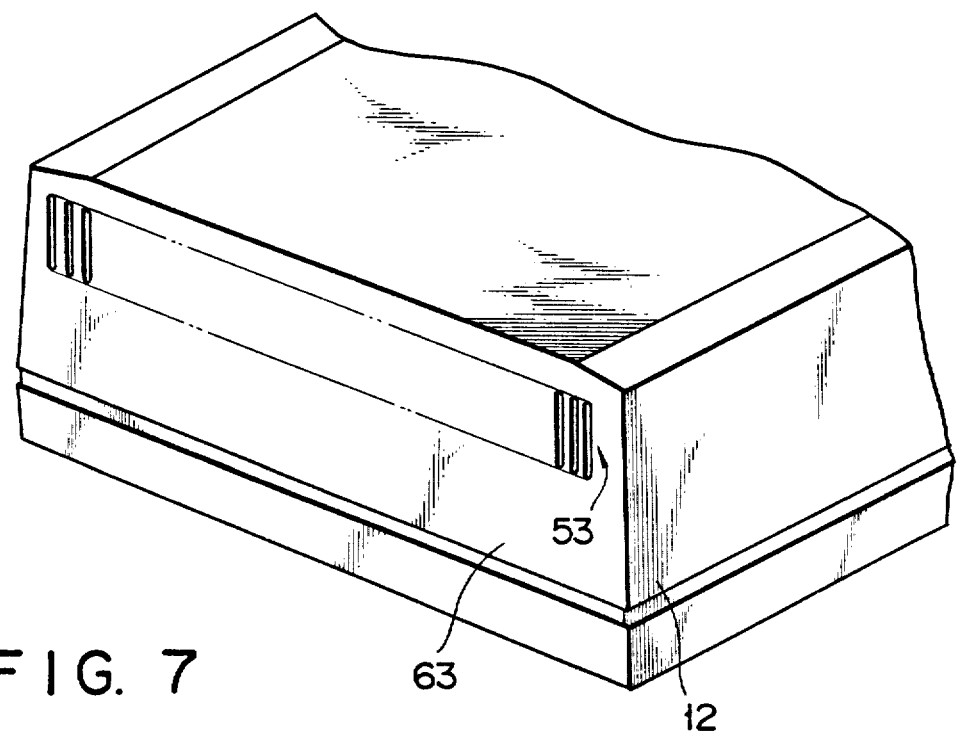
FIG. 7 is a fragmentary perspective view showing the back of the printer shown in FIG. 1.

As shown in FIGS. 6 and 7, the side wall 63 of the housing 12 facing the duct 58 via the rack unit 26 has, in an upper portion, a plurality of ventilating holes 53. Through these holes, air from the duct 58 is discharged. The holes 53 are positioned on the left side of the apparatus in FIG. 1.

Figure 8:
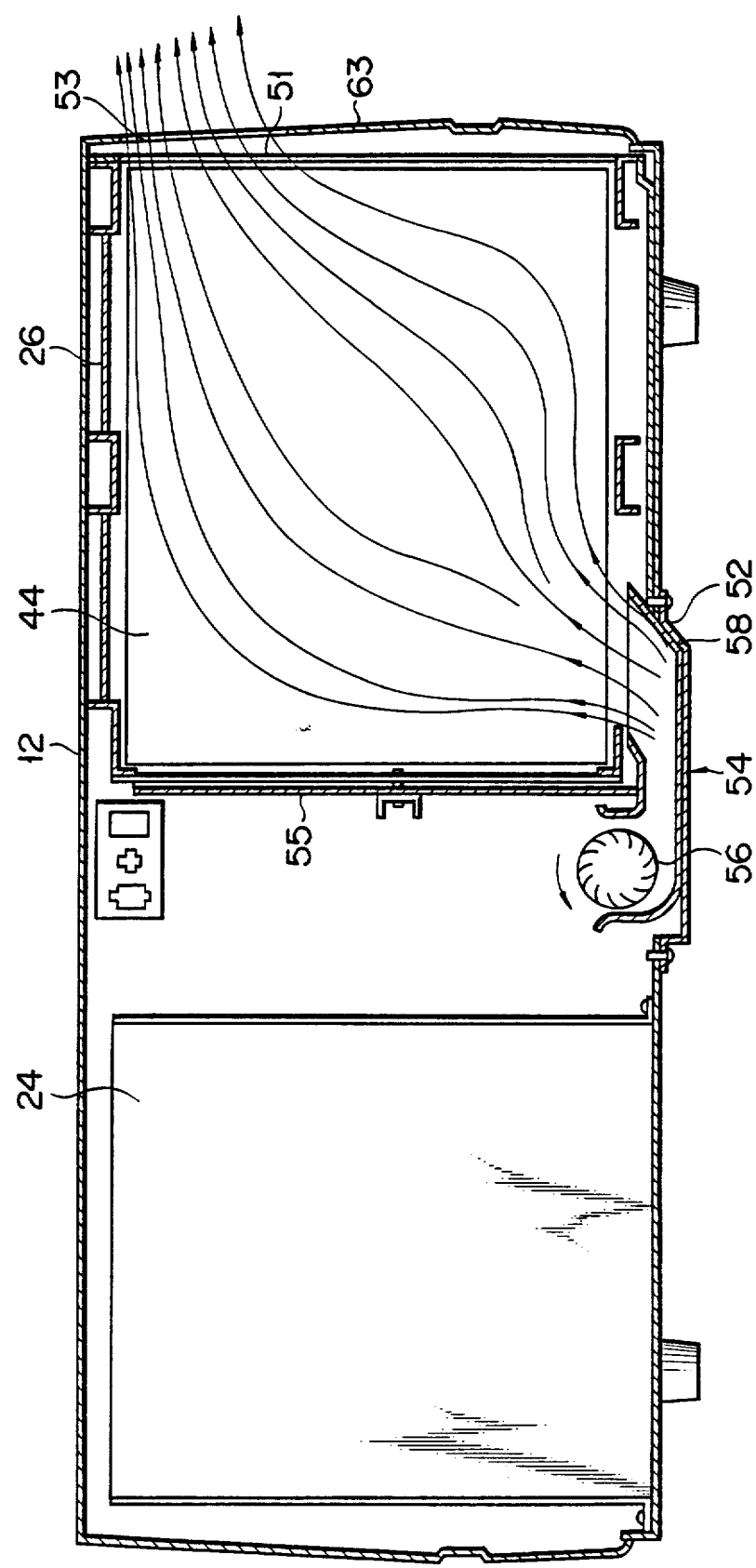
FIGS. 8 and 9 are views for explaining how cooling air flows through the printer shown in FIG. 1.
Figure 9:
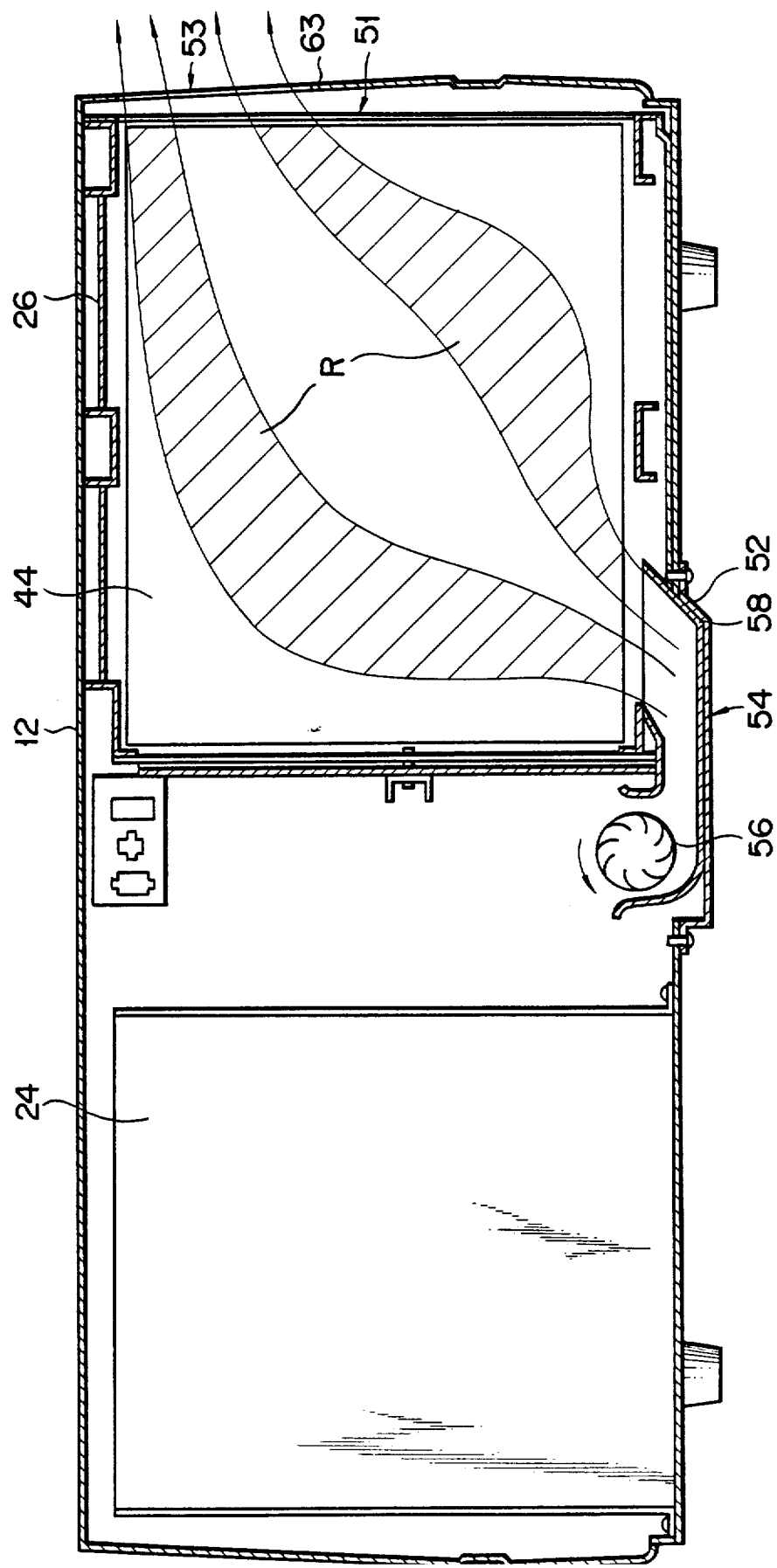

It will now be described how cooling air flows, with reference to FIGS. 8 and 9. Air led through the duct 58 into the box 48 flows, spreads once, and then somewhat converges toward the ventilating holes 53. More specifically, the air flows upwards in a rhombic range so that it can cover even the corners of the rack unit 26. In this case, air flows comparatively strong in shaded zones R shown in FIG. 9. Therefore, parts which generate a comparatively large amount of heat are preferably disposed on portions of the PC boards 44 corresponding to the zones R.

Figure 10:
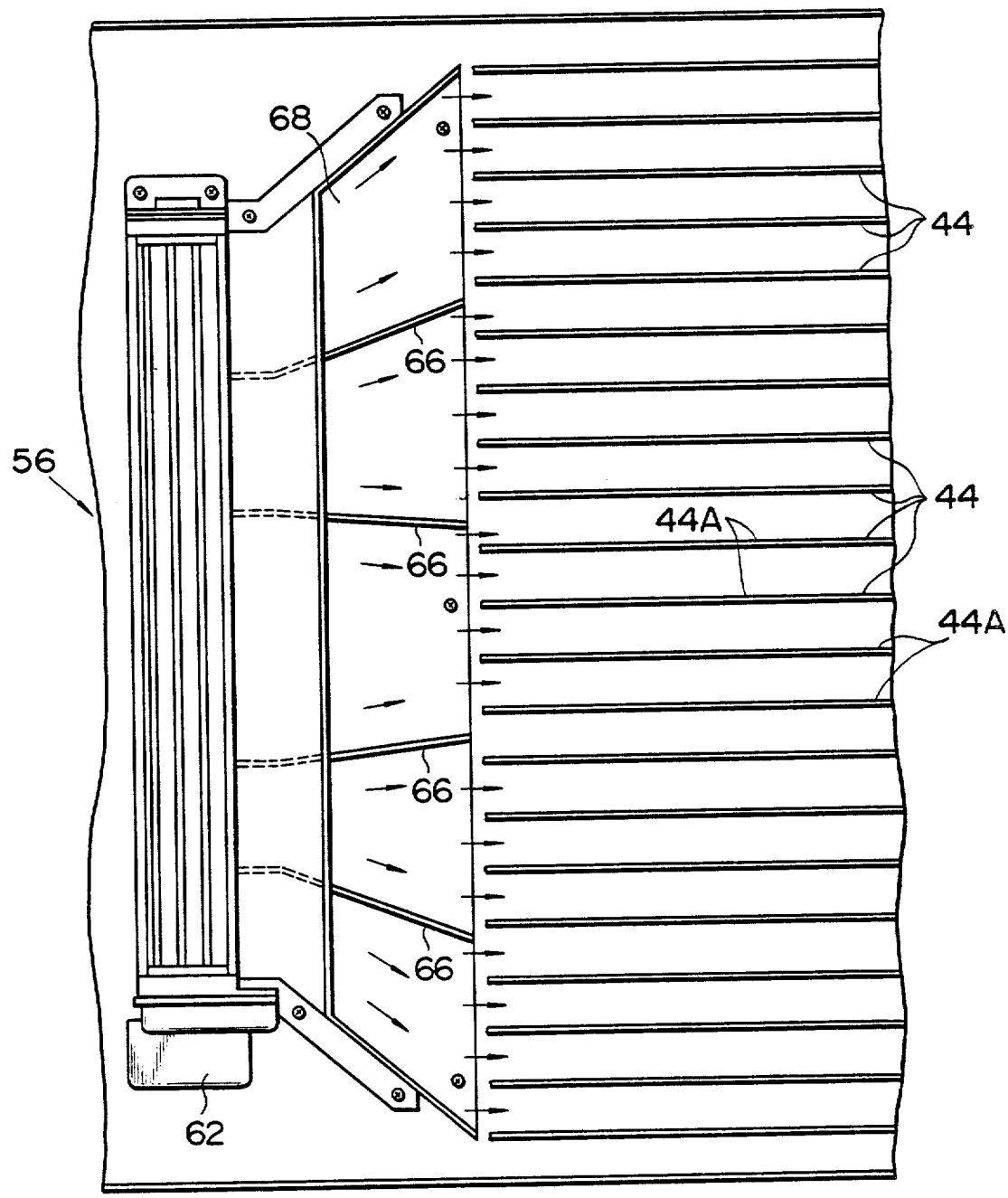
FIG. 10 is a plan view showing the fan unit used in a printer shown in FIG. 1.

As shown in FIG. 10, the duct 58 is provided in an air discharge zone with an air flow control unit 68, which includes deflectors 66 for distributing the air flow. Each deflector 66 is pivotally supported and can be rotated to the left and right. The quantity of air supplied to the PC boards 44 is controlled by turning (i.e., shifting) each deflector. For example, for a zone where PC boards generating a comparatively large amount of heat are arranged, a pair of deflectors are shifted such as to constrict the air flow.

With the provision of the air flow control unit 68 the PC boards can be cooled more efficiently.

The embodiment described above is given for the sake of illustration only. Various changes and modifications can be made without departing from the scope of the invention.

For example, the housing 12 may be provided in a portion corresponding to the cross flow fan with an air inlet. In this case, the cooling air is taken in from the outside of the printer.

As another example, instead of providing the duct in the groove formed in the base as in the above embodiment, it may be located beneath a side portion of the rack unit. In this case, the base can be flat.

Further, the deflectors provided at the air feed port of the duct in the above embodiment, may be dispensed with in case where the PC boards generate heat comparatively uniform.

Further, although the rack unit has been disposed on one side (i.e., on the left side of FIG. 1) of the image formation unit, this is by no means limitative, and it is possible to provide the rack unit behind the image formation unit. In this case, the ventilating holes are formed on the back of the apparatus, and air after cooling is discharged from the back of the apparatus.

Further, although the ventilating holes are provided in an upper portion of the side wall 63 facing the duct via the rack unit, this is by no means limitative, and they may be formed in the top plate or a different side wall of the housing.

Furthermore, the above embodiment is concerned with a thermal transfer printer as image forming apparatus. This is by no means limitative. The same effects may be obtained when the invention is applied to, for instance, an electronic copier, in which an image is formed by developing an electrostatic latent image with a toner.

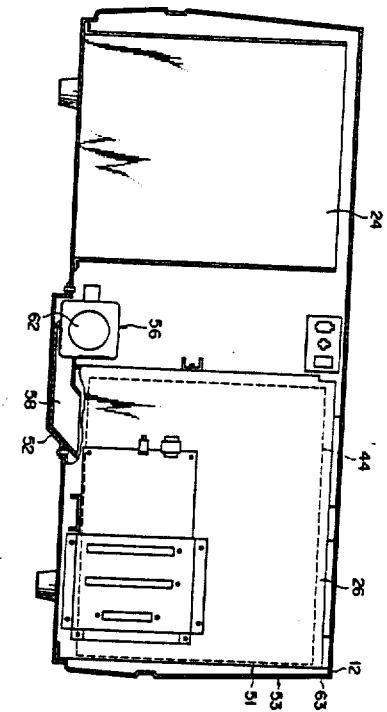

What is claimed is:

1. An image forming apparatus having an image formation unit and a rack unit containing printed circuit boards for forming an image on a paper sheet, said image formation unit and said rack unit being disposed side by side, comprising:
    a duct disposed in a groove at the bottom of the apparatus such that said rack unit communicates with a space located between said image formation unit and said rack unit; and
    a fan unit, disposed in said duct, for supplying air for cooling said printed circuit boards, said fan unit having a cross-flow fan.

2. An apparatus according to claim 1, wherein said image forming apparatus further has a base for supporting said image formation unit and rack unit on the same plane, said base being formed with said groove.

3. An apparatus according to claim 2, wherein said groove constitutes part of the bottom of said rack unit.

4. An apparatus according to claim 1, wherein said image forming apparatus further has a housing accommodating said image formation unit and rack unit integral with each other, said housing being formed with a ventilating hole, through which air supplied from said fan unit is let out of the apparatus.

5. An apparatus according to claim 4, wherein said housing is formed with a ventilating hole facing said fan unit diagonally in section.

6. An apparatus according to claim 1, wherein said fan unit includes control means for locally controlling the amount of air supplied.

7. An apparatus according to claim 6, wherein said control means includes a plurality of deflectors disposed along the flow of air and capable of being shifted in a direction crossing the direction of air flow.

8. An apparatus according to claim 1 wherein said duct includes means for upwardly guiding an air flow from said cross-flow fan into said rack unit.

9. An image forming apparatus comprising:
    an image formation unit;
    a rack unit containing printed circuit boards for forming an image on paper sheet, said rack unit being provided with an air inlet hole at a lower portion on one side thereof and an air outlet hole at an upper portion on the other side thereof, said rack unit and said image formation unit being disposed side by side with a certain space therebetween;
    a duct disposed in a groove at the bottom of the apparatus, for allowing communication between said space and the air inlet hole of said rack unit; and
    a fan unit, disposed in said duct, for supplying air for cooling said printed circuit boards, said fan unit having a cross-flow fan.

* * * * *

UNITED STATES PATENT AND TRADEMARK OFFICE
CERTIFICATE OF CORRECTION

PATENT NO. : 4,645,333

DATED : February 24, 1987

INVENTOR(S) : Junji Watanabe

It is certified that error appears in the above-identified patent and that said Letters Patent is hereby corrected as shown below:

The title page should be deleted to appear as per attached title page.

The sheets of Drawings consisting of Figures 1-4 should be deleted to appear as per attached sheets consisting of Figures 1-10.

Signed and Sealed this

Twenty-sixth Day of January, 1988

Attest:

DONALD J. QUIGG

Attesting Officer     Commissioner of Patents and Trademarks

United States Patent [19]

Watanabe

[11] Patent Number: 4,645,333

[45] Date of Patent: Feb. 24, 1987

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 738,251

[22] Filed: May 28, 1985

[30] Foreign Application Priority Data

Jun. 1, 1984 [JP] Japan .................................. 59-112503

[51] Int. Cl.⁴ ............................................ G03B 27/52
[52] U.S. Cl. ..................................... 355/30; 361/383; 361/384; 165/80.2; 165/80.3; 346/76 R
[58] Field of Search ................... 355/3 D; 174/15 R; 361/383, 384; 165/80 A; 353/57, 58, 60; 346/76 R

[56] References Cited

U.S. PATENT DOCUMENTS

| 3,790,859 | 2/1974 | Schraeder et al. ................ 361/384 |
| 4,089,040 | 5/1978 | Paulsen .......................... 361/384 X |
| 4,217,952 | 9/1980 | Kelly ............................ 361/384 X |

OTHER PUBLICATIONS

Toshiba BD-7812 Service Manual.

Primary Examiner—L. T. Hix
Assistant Examiner—D. Rutledge
Attorney, Agent, or Firm—Oblon, Fisher, Spivak, McClelland & Maier

[57] ABSTRACT

An image forming apparatus comprises an image formation unit and a rack unit accommodating printed circuit boards. A fan unit for cooling the printed circuit boards is provided along one side of the bottom of the housing of the apparatus. A cross-flow fan is used for the fan unit.

9 Claims, 10 Drawing Figures